L. A. Dole,
Boring Wood,
No. 20,779. Patented July 6, 1858.
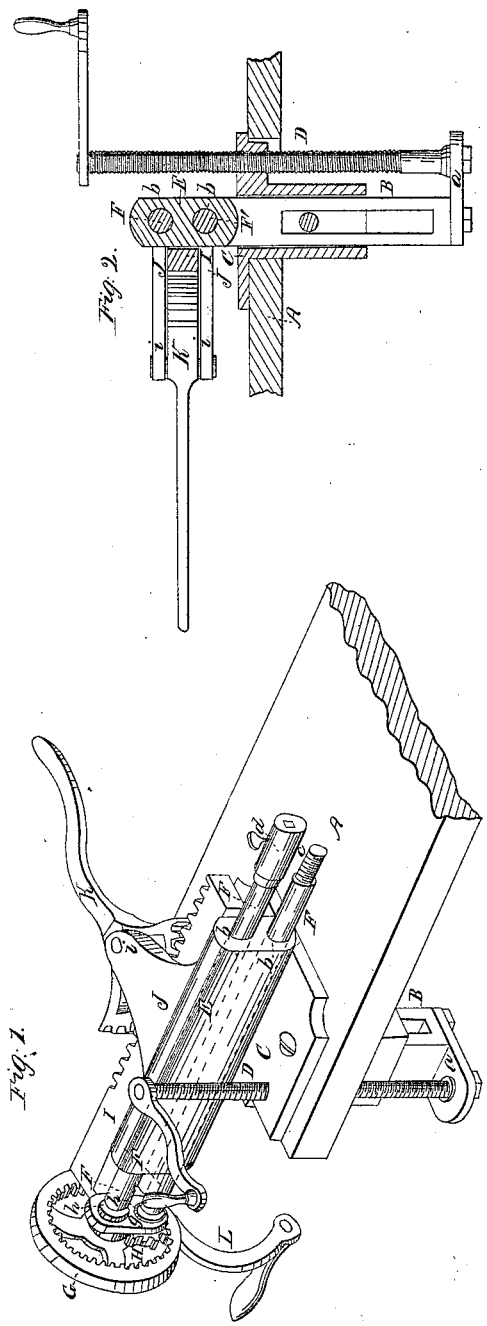

UNITED STATES PATENT OFFICE.

L. A. DOLE, OF SALEM, OHIO.

BORING-MACHINE.

Specification of Letters Patent No. 20,779, dated July 6, 1858.

*To all whom it may concern:*

Be it known that I, L. A. DOLE, of Salem, in the county of Columbiana and State of Ohio, have invented a new and useful Improvement in Machines for Boring Wood; and I do hereby declare that the following is a full, clear, and exact description of the same, reference being had to the accompanying drawings, forming a part of this specification, in which—

Figure 1, is a perspective view of a boring machine constructed after my invention. Fig. 2, is a vertical transverse section of the same.

Similar letters of reference, in each of the several figures indicate corresponding parts.

The nature of my invention consists in the combination of two drill stocks by means of an internally geared driving wheel and a small pinion, so that a slow or fast speed drill or auger may be used at pleasure, as the necessity of the case may require, in the same machine, and by the turning of one and the same crank.

It also consists in effecting the combination of both of said drill stocks with the feeding rack bar and the toothed segment lever, by means of a flange on the rear end of the rack bar and collars on the drill stocks, so that both shall be fed up together.

To enable others, skilled in the art, to make and use my invention, I will proceed to describe its construction and operation.

A, represents a portion of a work bench.

B, is an adjustable standard upon which the drill is mounted. This standard slides up and down in a metal guide C, of the frame, its adjustment being accomplished by means of a vertical screw D, which is attached by its lower end to a flange *a*, of the standard and passed up through a screw tapped hole in a flange of the guide C, as shown.

E, is a horizontal tubular guide. This guide is cast with the standard B, and has two guide passages *b*, *b*, for the two drill stocks to slide freely through.

F, F′, are the drill stocks fitted within the tubes so as to extend beyond the front and rear ends of the tubular guides. On the front end of each of the drill stocks, I provide a screw thread *c*, *c*, so as to fasten a head *d*, for receiving and holding the end of the auger or boring tool as shown in Fig. 1. On the rear end of the drill stock F, a large internally toothed driving wheel G, is fastened and on the end of the drill stock F′, a small pinion H, is fastened. The pinion H, is arranged within the circle of the internally toothed wheel G, and gears with the teeth of the same as shown in Fig. 1. The large wheel G, serves for giving a slow speed to the auger stock F, which is intended to carry a large auger or boring tool; while small pinion H, serves for giving a fast speed to the drill stock F′, which is intended to carry a small auger or boring tool. It is very essential thus to have two different speeds, as large augers or boring tools require to be worked with a slow speed while small augers or boring tools can be worked with a fast speed.

I, is a feeding rack bar. It is arranged in a guide J, alongside the tubular guide E, being connected to the two drill stocks by means of a flange *g*, on its end, said flange being confined between the collars or shoulders *h*, *h*, of the drill stocks and the small and large wheels G. H, as shown.

K, is a toothed segment lever. It is arranged between and pivoted to the ears *i*, *i*, of the rack bar guide and gears into the teeth of the rack bar. This lever is forced forward by hand as the driving wheel is turned by the crank L, and thus a forward feed of the drill stocks is effected simultaneously with its revolution of the same.

This drill is very compact and avoids the expense of having two separate drills in order to bore light and heavy work.

What I claim as my invention and desire to secure by Letters Patent, is—

1. The combination of two drill stocks F, F by means of an internally geared driving wheel G, and a small pinion H so that a slow or fast speed drill or auger may be used at pleasure, as the necessity of the case may require, in the same machine and by the turning of one and the same crank, substantially as and for the purposes set forth.

2. Effecting the combination of both of said drill stocks F, F′ with the feeding rack bar I, and the toothed segment lever K, by means of a flange *g*, on the rear end of the rack bar and collars *h*, *h*, on the drill stocks F, F′, so that both shall be fed up together, substantially as and for the purposes set forth.

The above specification of my improvement in machines for boring wood signed by me this 21st day of May, 1858.

L. A. DOLE.

Witnesses:
EDWARD H. FAUCETT,
ALLEN S. FELCH.